US005662804A

United States Patent [19]

Dufour

[11] Patent Number: 5,662,804
[45] Date of Patent: Sep. 2, 1997

[54] METHOD AND APPARATUS FOR SEPARATING NON-SOLUBLE PARTICLES FROM A LIQUID

[75] Inventor: Reneau Dufour, Breakeyville, Canada

[73] Assignee: Les Traitements des Eaux Poseidon Inc., Outremont, Canada

[21] Appl. No.: 620,884

[22] Filed: Mar. 22, 1996

[30] Foreign Application Priority Data

Mar. 23, 1995 [GB] United Kingdom ............... 9505891

[51] Int. Cl.$^6$ .................... C02F 1/24; B01D 17/035
[52] U.S. Cl. ................... 210/703; 210/712; 210/802; 210/804; 210/805; 210/194; 210/202; 210/221.2; 210/295
[58] Field of Search .................. 210/703, 712, 210/802, 804, 805, 194, 202, 221.2, 295

[56] References Cited

U.S. PATENT DOCUMENTS

| | | |
|---|---|---|
| 2,479,126 | 8/1949 | Lipscomb . |
| 2,780,362 | 2/1957 | Sabi . |
| 2,894,637 | 7/1959 | Schreiber . |
| 3,754,656 | 8/1973 | Horiguchi et al. . |
| 4,194,976 | 3/1980 | Robinsky . |
| 4,299,703 | 11/1981 | Bezard . |
| 4,589,984 | 5/1986 | Legrand . |

FOREIGN PATENT DOCUMENTS

| | | |
|---|---|---|
| 0108326 | 5/1984 | European Pat. Off. . |
| 2144862 | 2/1973 | France . |
| 637526 | 12/1934 | Germany . |
| 1072930 | 1/1960 | Germany . |
| 2348845 | 4/1975 | Germany . |
| 545589 | 3/1977 | U.S.S.R. . |
| 858918 | 8/1981 | U.S.S.R. . |
| 1555293 | 4/1990 | U.S.S.R. . |
| 1660713 | 7/1991 | U.S.S.R. . |

*Primary Examiner*—Thomas M. Lithgow
*Attorney, Agent, or Firm*—Robic

[57] ABSTRACT

Disclosed is a clarifier for use in treating a liquid containing non-soluble particles in suspension in order to separate these particles from the liquid. It comprises a tank, a liquid supply duct opening into the bottom portion of the tank and an injector for injecting a gas under pressure into at least part of liquid supplied to the supply duct in order to saturate this liquid with said gas and thus to generate gas bubbles as the saturated liquid is subject to depressurization within the tank. The gas bubbles that are so-generated adhere to the particles in suspension in the liquid and lift them up to form a floating layer of sludge in the top portion of the tank. A scraper is provided in the top portion of the tank for skimming off the layer of sludge while it is formed. A plurality of plates extend at an angle within the tank above the supply duct. These plates define a set of upwardly inclined channels each having an upper end that is opened and through which the liquid fed into the tank may enter the channel. A liquid outlet mounted within the lower end of each channel to collect and remove from the tank the liquid that has been treated within the same. Thanks to its shape and structure, this clarifier occupies a surface area on the ground that is 50% or less smaller than any known clarifier of the same capacity. Its structure also permits to maintain much more microbubbles of requested size for a same amount of injected air in order to increase the probability of contact between the particles and the air bubbles.

13 Claims, 4 Drawing Sheets

METHOD AND APPARATUS FOR SEPARATING NON-SOLUBLE PARTICLES FROM A LIQUID

BACKGROUND OF THE INVENTION a) Field of the Invention

The present invention relates to a method for treating a liquid containing non-soluble particles in suspension in order to separate these particles from the liquid.

The invention also relates to an apparatus hereinafter called "clarifier", for use to carry out this method.

In the following disclosure, reference will be made almost exclusively to waste water as an example of such a liquid containing non-soluble particles that can be treated by the method according to the invention. However, it must be understood that the invention is not restricted to the treatment of waste water, as it could actually be used to treat any other kind of liquid in order to remove from the same solid particles that are in suspension. Such other liquid could be petroleum, oil, chemicals. etc. . .

b) Brief Description of the Prior Art

It is of common practice in numerous industries, especially in the pulp and paper industry to treat the waste water that is generated within the plants in order to separate the non-soluble particles that may be in suspension in it prior to discarding and/or recycling the waste water.

Usually, such a treatment is carried out in one or more apparatuses called "clarifiers" or "dissolved air-floatation units". As is shown in FIG. 1 identified as "prior art", the known clarifiers comprise a tank 1 in which the liquid to be treated is fed through a supply duct 3. Part of the liquid passing through the duct 3 is derived from the same via a line 4, and is saturated with air or any other gas under pressure prior to being reinjected into the supply duct by means of a pump 5. Alternatively, part of the clarified liquid leaving the tank 1 is derived from the outlet of the same via a line 4' and is saturated with air prior to being injected into and mixed with the liquid fed through the duct 3. In both cases, as soon as the air-saturated liquid enters the duct 3, it is subject to a depressurization which generates gas bubbles of a few micrometers within the tank. Such micro-bubbles adhere to the particles in suspension in the liquid and form "flocs" that are buoyant, thereby forming a floating layer of sludge 7 that is mechanically skimmed off from the tank with a scraper 9. The remaining, "clarified" liquid is removed form the tank via a plurality of liquid outlets 11 that are located in a pipe extending close to the bottom of the tank.

To improve the efficiency of the clarifier, it is of common practice to mount a plurality of upwardly inclined plates or baffles 13 in parallel relationship within the tank in order to divide the same into a plurality of upwardly inclined channels having upper ends at a short distance from under the floating layer of sludge 7, and lower ends close to or opening directly into the liquid outlets 11. Such a division of the liquid supplied into the tank into a plurality of separate channels increases the surface separation of the clarifier and reduces the flow to surface ratio (also called "overflow rate") within the clarifier, thereby favorizing separation of the particles.

In this connection, it can be understood that within each channel defined by a pair of plates, viz. an "upper" one and a "lower" one, both extending at the same inclined angle, the small particles lifted up by the microbubbles have time to move up to the upper plate and then to "slide" up along this upper plate while they agglomerate into larger particles. In the meantime, the liquid may slowly move down towards the outlet 11. Such a counterflow motion within each channel is schematically exemplified with dots representative of the particles, and with arrows in one of channels identified by letter "A" in FIG. 1.

To improve the efficiency of the clarifier, it is also of common practice to add polymeric additives to the liquid fed within the tank in order to agglomerate the particles into larger particles, thereby improving their floatation.

In use, the existing clarifiers are quite efficient and are used for the treatment of waste water containing up to 1% or more of particles in suspension with removal of about 10 to 80 kg of particles per $m^2$ and per hour.

However, the existing clarifiers also have drawbacks because of their "horizontal" structure, they require a substantial amount of space that makes them cumbersome and difficult to install in existing premises.

Secondly, whatever be the amount and pressure of the air injected into the waste water prior to its introduction in to the tank, the generation of micro-bubbles within the tank is difficult to control and adjust because fast and sudden depressurization occurs as soon as the waste water enters the tank at one end thereof, thereby causing most the air bubbles to be generated and to move up at this one end without necessarily adhering to particles, thereby reducing the overall efficiency of the clarifier.

SUMMARY OF THE INVENTION

A first object of the present invention is to provide a clarifier for use in treating a liquid containing non-soluble particles in suspension in order to separate these particles from the liquid, which, thanks to its shape and structure, occupies a surface area onto the ground that is 50% or less smaller than any known clarifier of the same capacity in spite of the fact that the water velocity inside the clarifier is the same or lower than in such known clarifier.

A second object of the invention is to provide a clarifier which permits to maintain much more microbubbles of requested size for a same amount of injected air in order to increase the probability of contact between the particles and the air bubbles.

A third object of the invention is to provide a clarifier of the above type, which permits to collect and remove much more particles as can be usually collected with the known clarifier for a same amount of polymeric additive.

In accordance with the invention, these objects are achieved with a clarifier for use in treating a liquid containing non-soluble particles in suspension in order to separate these particles from the liquid, which comprises:

a tank of given height having a top portion and bottom portion;

a supply duct opening into the bottom portion of the tank for feeding the liquid to be treated into the tank;

injection means for injecting a gas under pressure into some of the liquid supplied into the supply duct in order to saturate the liquid with the gas and thus allow generation of gas bubbles as the saturated liquid is subject to depressurization within the tank, the gas bubbles that are so-generated adhering to the particles in suspension in the liquid and lifting them up to form a floating layer of sludge in the top portion of the tank;

scraping means in the top portion of the tank for skimming off the layer of sludge while it is formed;

a plurality of plates extending at an angle within the tank above the supply duct, these plates defining a set of upwardly inclined channels each having an open upper end through which the liquid fed into the tank may enter the channel, each channel also having a lower end; and a liquid outlet mounted within the lower end of each channel to collect and remove from the tank the liquid that has been treated within the same.

Advantageously, a screen can be integrated to the liquid outlet in order to filtrate the liquid that is removed from the tank.

The invention also provides a method for treating a liquid containing non-soluble particles in suspension in order to separate these particles from the liquid, which is more efficient than the known method. This method comprises the steps of:

providing a tank of a given height having a top portion, a bottom portion with a liquid supply duct, and a plurality of internal plates extending at an angle with the tank, the plates defining a set of upwardly inclined channels each having an upper end that is opened, and a lower end;

injecting a gas under pressure into some of the liquid to be treated in order to saturate said liquid with the gas;

feeding the gas-saturated liquid in the duct at the bottom portion of the tank under the plates, the liquid that is so fed being subject to depressurization, thereby generating gas bubbles that adhere to the particles in suspension in the liquid and lift them up to form a floating layer of sludge in the top portion of the tank;

skimming off the layer of sludge while it is formed in the top portion of the tank; and collecting and removing the liquid treated within the tank at the lower end of each channel.

Advantageously, the feeding step is carried out through a nozzle located under the internal plates so that the liquid to be treated be subjected to a controlled depressurization and may impinge the internal plate that is adjacent to the bottom portion of the tank.

Advantageously also, the method may comprise the additional steps of:

selecting an optimum overflow rate of treatment depending on the liquid to be treated; and selecting the number of plates within the tank and thus the relative size of each channel to obtain the selected optimum overflow rate.

BRIEF DESCRIPTION OF THE DRAWINGS

The invention and its advantages will be better understood upon reading the following non-restrictive general description made with reference to the accompanying drawings in which.

GENERAL DESCRIPTION OF THE INVENTION

Figure 1:
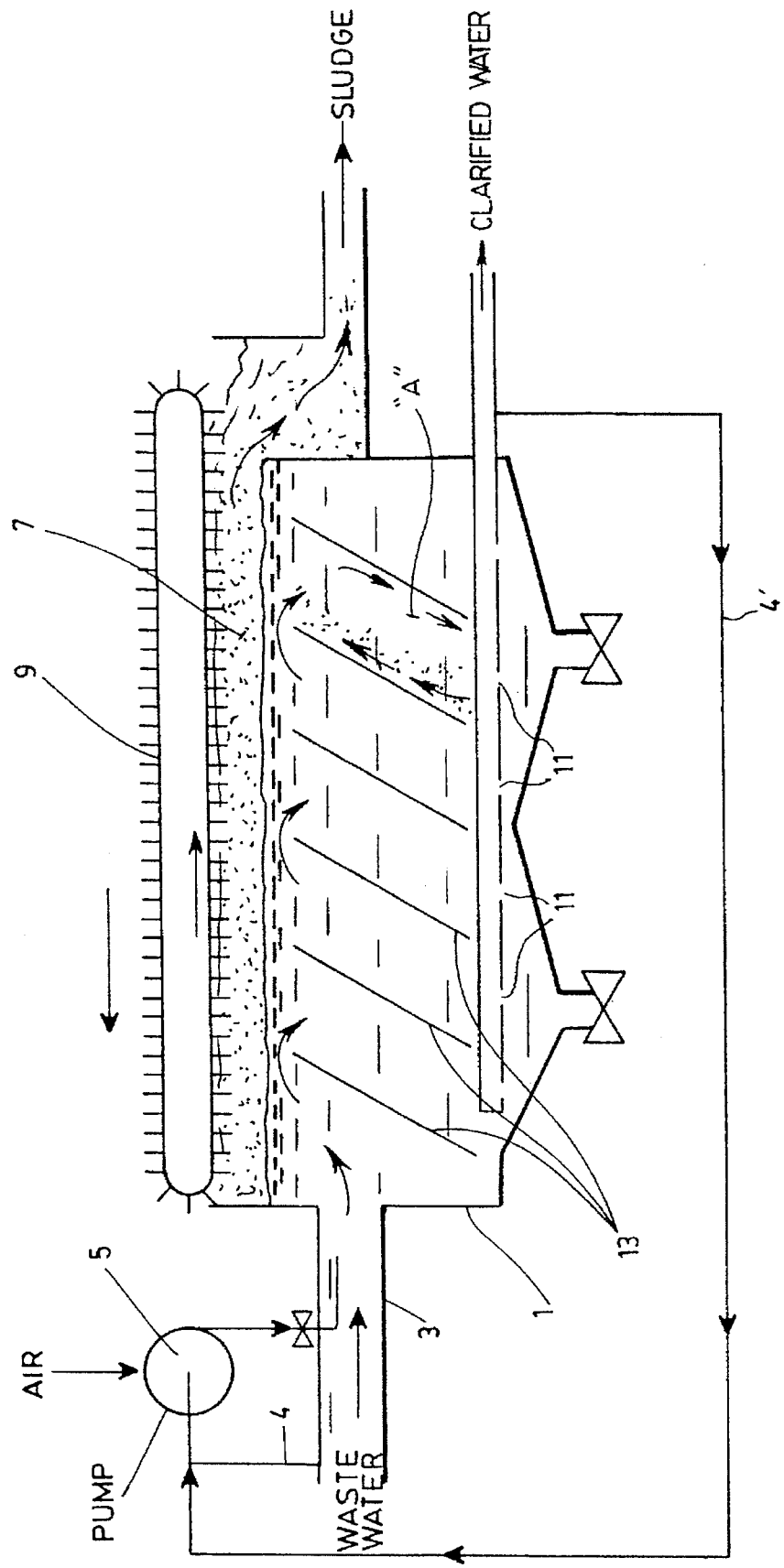
FIG. 1 identified as "prior art" is a schematic, cross-sectional representation of one of the most compact clarifiers presently available in the trade.
Figure 2:
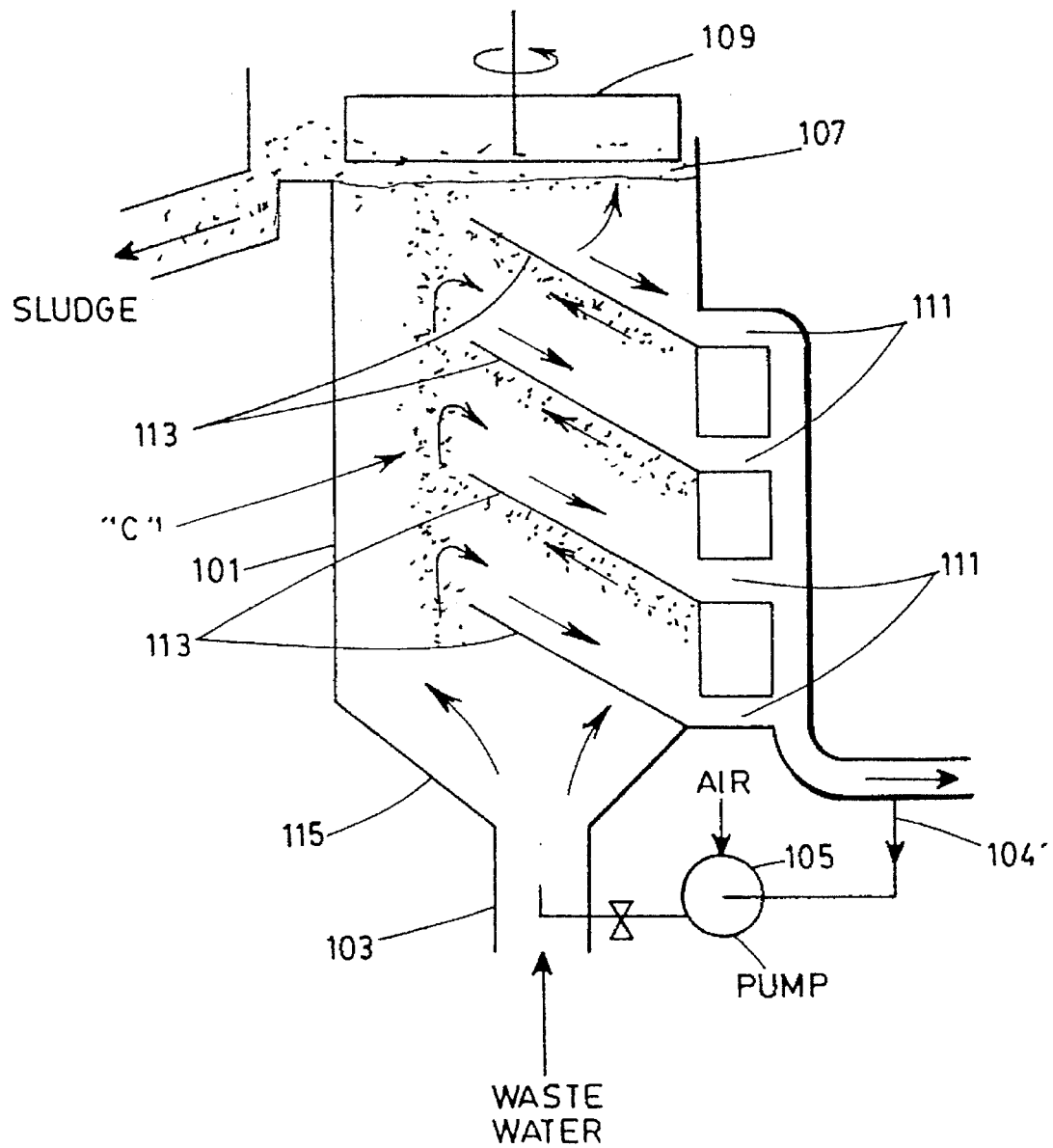
FIG. 2 is a schematic cross-sectional representation of the basic structure of a clarifier according to the invention.

As is shown in FIG. 2, the clarifier according to the invention comprises the same basic structural elements as the known clarifier shown in FIG. 1.

Thus, like the known clarifier, it comprises:

a tank 101 in which the liquid to be treated is fed through a supply duct 103;

a derivation line (not shown) connected to the duct 103 and leading to a pump 105 in which air under pressure is injected into the derived liquid before this liquid is fed back to the duct or, as is shown, a derivation line 104' connected to the clarified water outlet and leading to the pump 105, for the very same purpose as above;

a plurality of plates 113 extending at an angle within the tank and defining a set of upwardly inclined channels;

liquid outlets 111 at the lower ends of the channels; and a scraper 109 to evacuate the sludge 107 floating on top of the tank.

The only yet important differences between the known clarifier and the clarifier according to the invention are that:

the tank 101 extends vertically instead of horizontally;

as a result of such an "orientation" of the tank, the supply duct 103 is located at the bottom of the tank 101 instead of being located at one lateral end thereof;

the plates 113 extend in parallel relationship one above the other along the height of the tank instead of extending in parallel relationship along the length of the same;

the scraper 109 on top of the tank is opposite to the supply duct 103 instead of extending adjacent to this duct; and the bottom portion 115 of the tank 101 into which the supply duct 103 opens, or, alternatively, the outlet of supply duct itself is tapering upwardly and outwardly to define a nozzle.

These structural differences are essential and make the clarifier according to the invention much better than any known clarifier of the same capacity, for the following reasons.

First of all, the vertical orientation of the tank 101 substantially reduces the surface area occupied by the same onto the ground. This is a tremendous advantage.

Secondly, the introduction of the waste water (or liquid to be treated) is made at the bottom of the tank 101, where the water column is the highest. Also, the shape of the bottom portion 115 of the tank defines a kind of "nozzle". Both of these features permit to control in a much better way the generation and size of the microbubbles of gas. More specifically, the back pressure resulting from the introduction of the waste water at the bottom of the tank and the shape of the bottom portion of the tank (or the outlet of the supply duct) permits to better control the generation of the microbubbles of the requested size for a same amount of injected air, as compared to the known clarifier, thereby making it possible to reduce the amount and associated cost of polymeric additives that are often required to improve the flocculation mechanism.

Thirdly, the fact that the microbubbles are generated at the bottom of the tank and move up along the full height of the same, substantially increases the concentration and distribution of microbubble and thus the opportunities for such bubbles to contact non-soluble particles in suspension in the liquid, to attach to the same and to lift them up.

Fourthly, the fact that the flow of injected liquid and microbubbles is directed towards and actually hits the lower plate 113 of the clarifier which is just above the supply duct 103, increases also the "opportunity" for the gas bubbles and/or the non-soluble particles to attach to each other and become buoyant.

Fifthly, due again to the fact that the microbubbles are generated at the bottom of the tank and this tank has a substantially reduced surface area as compared to the tanks of the know clarifiers, floatation and skimming off of the layer of sludge on top of the clarifier is substantially improved, since this layer of sludge extends over the full surface area of the top of the tank because of its reduced size, and becomes much thicker. Moreover, contrary to all the existing clarifiers, there is no transversal liquid flow or current under the layer of sludge, which may infer with the floatation of the sludge.

Sixthly, the flow rate of the clarifier can be increased by increasing the height of the tank and the numbers of plates within the same without modifying the surface area occupied on the ground.

Last of all, the fact that the microbubbles and solid particles attached thereto move up through a restricted passage between the lateral wall(s) of the tank and the upper edges of the plates 113 is critical, since these microbubbles and particles this form a kind of vertical curtain "C" which actually acts as a filter for the liquid that "turns" down at the upper edges of the plates and move toward the liquid outlets 111.

All these structural features altogether make the clarifier according to the invention much easier to install and use and much more efficient that the know clarifiers presently in use on an industrial scale.

The clarifier according to the invention as it is shown in FIG. 2 can take numerous practical forms from an industrial standpoint.

Figure 3:
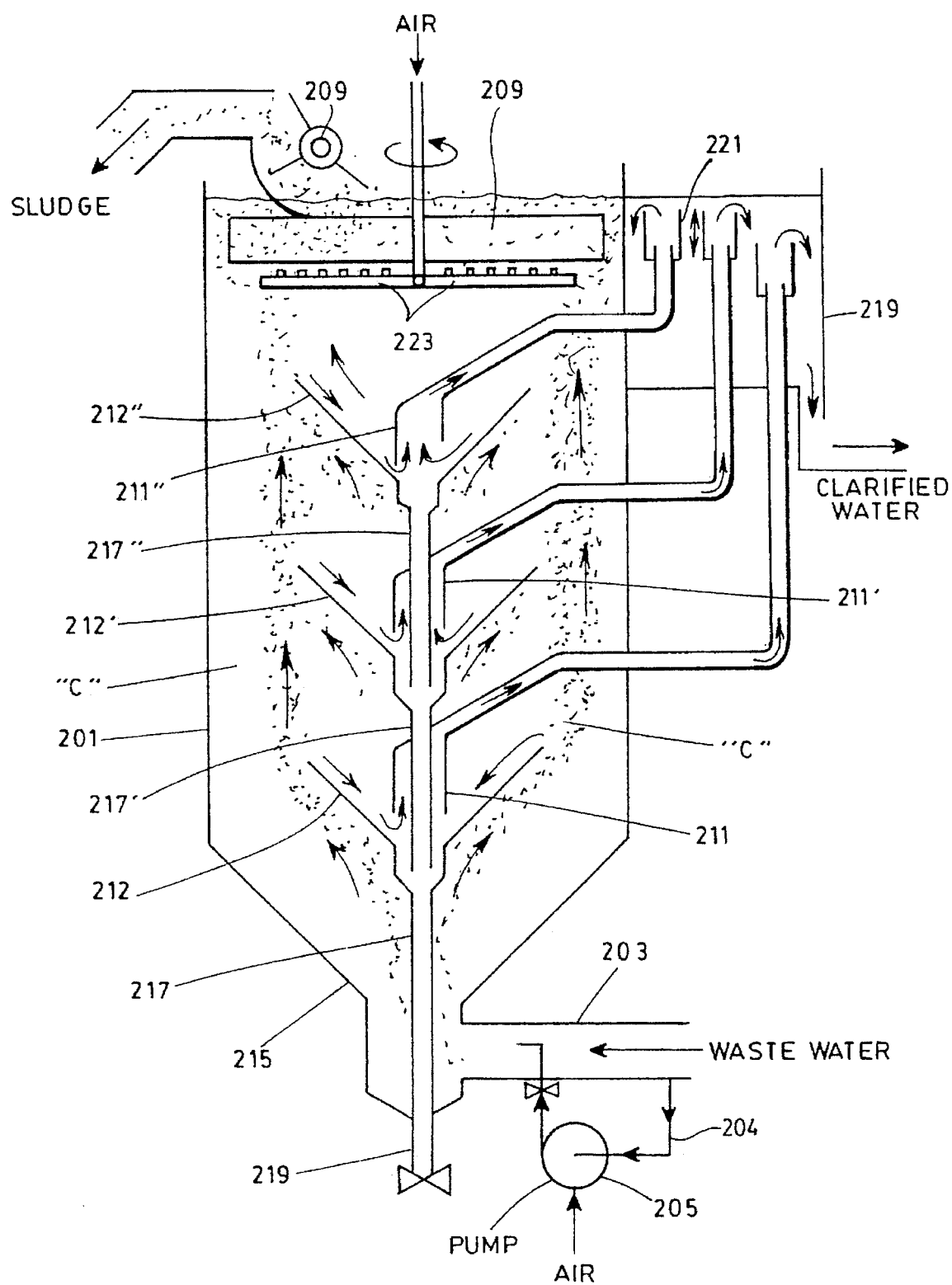
FIG. 3 is a schematic, cross-sectional representation of a clarifier according to a first preferred practical embodiment of the invention.

FIG. 3 is a schematic representation of a clarifier according to a first preferred practical embodiment of the invention.

This clarifier comprises a vertical tank 201 in which a plurality of funnels 212, 212', 212", ... are stacked one above the other. As is shown, the funnels are of the same shape and are centrally positioned within the tank. They have a same apex which is preferably equal to 90° and a cross-sectional shape preferably identical to the one of the tank 201. Thus, if the tank is round in cross-section, the funnels will also be round in cross-section. If the tank is square in cross-section, the funnels will be square in cross-section.

A supply duct 203 opens into the bottom portion 215 of the tank 201, which is shaped in such a manner as to be of the same cross-section and apex as the funnel 212 positioned just above it. A pump 205 injects air or any other gas under pressure into some the liquid derived from the duct 203 via a line 204. The so-derived liquid is fed back into the duct leading to the tank 201.

The walls of the funnels 212, 212', 212", ... are equivalent to the plates or baffles mentioned hereinabove and define together a corresponding set of inclined channels whose upper ends are at a short distance from the lateral walls of the tank 201 and whose lower ends are at the apexes of the funnels.

Collecting pipes 217, 217', 217", ... are provided to collect the heavy particles that may be lifted up and fall within the funnels during treatment. As is shown, each collecting pipe 217 projects downwardly from the apex of the corresponding funnel 212. Preferably, these collecting pipes are coaxially mounted and lead to a same exit 219 closed by a valve.

Liquid outlets 211, 211', 211", ... are also provided to collect and remove from the tank the liquid that has been treated within the same. These outlets are respectively mounted at the apices of the funnels, viz. at the lower end of the inclined channels defined by these funnels, above the collecting pipes. Each liquid outlet 211 preferably opens into a reservoir 219 adjacent to the tank 201 and is provided with flow control means such as a control valve or a sliding sleeve 221 that can be moved up or down to adjust the height of liquid within the tank and, optionally, to control the outflow of liquid passing through each outlet 211 into the reservoir, merely by adjustment of the height of the water column above the outlet. Such makes it possible to adjust the flow rate within the corresponding channel.

Of course, scraping means 209 are also provided on top of the tank 201 to skim off the layer of sludge that is formed. Such scraping means can be of any type.

In use, a gas is injected into some of the liquid fed into the tank 201. Polymeric additives, viz. flocculants, can also be added to such liquid. The mixture is fed at the bottom of the tank through the supply duct 203.

As the mixture enters the tank, the compressed gas dissolved in it is liberated and generates microbubbles of gas. Such a liberation is well controlled thanks to the nozzle shape of the bottom portion 215 of the tank. The microbubbles that are so-generated, adhere to the non-soluble particles contained in the liquid, and lift them up towards the adjacent bottom surface of the lowest funnel 212. The particles slide along this bottom surface and them move like a curtain "C", until they get to the surface.

While it moves along the lateral walls of the tank, the mixture equally separates and enters into the channels defined by the stacked funnels 212, 212', 212", ... as is depicted by the arrows in FIG. 3.

As the liquid flows down towards the apex of each funnel, a further separation of the particles still contained in it takes place at the adjacent bottom surface of the funnel located immediately above. Then, the particles slide along this bottom surface, until they reach the outer periphery of the funnel. In the case of the upper funnel 212", the particles are lifted up directly to the surface of the tank.

The liquid flows down to the bottom of each funnel and is collected through the liquid outlet 211, 211', 211", ...

The collecting pipes 217, 217', 217", ... opening at the bottom of the funnels allow the remaining, denser particles to trickle down and be collected into the pipe 217 projecting from the bottom of the lowest funnel 212.

The very stable layer of sludge which forms on the surface of the tank 2 is skimmed off as is known. To increase the dry solid content of this layer of sludge, an air diffuser 223 can be mounted under the scraping means 209, so as to permanently inject air or an air-saturated liquid under the layer of sludge.

Figure 4:
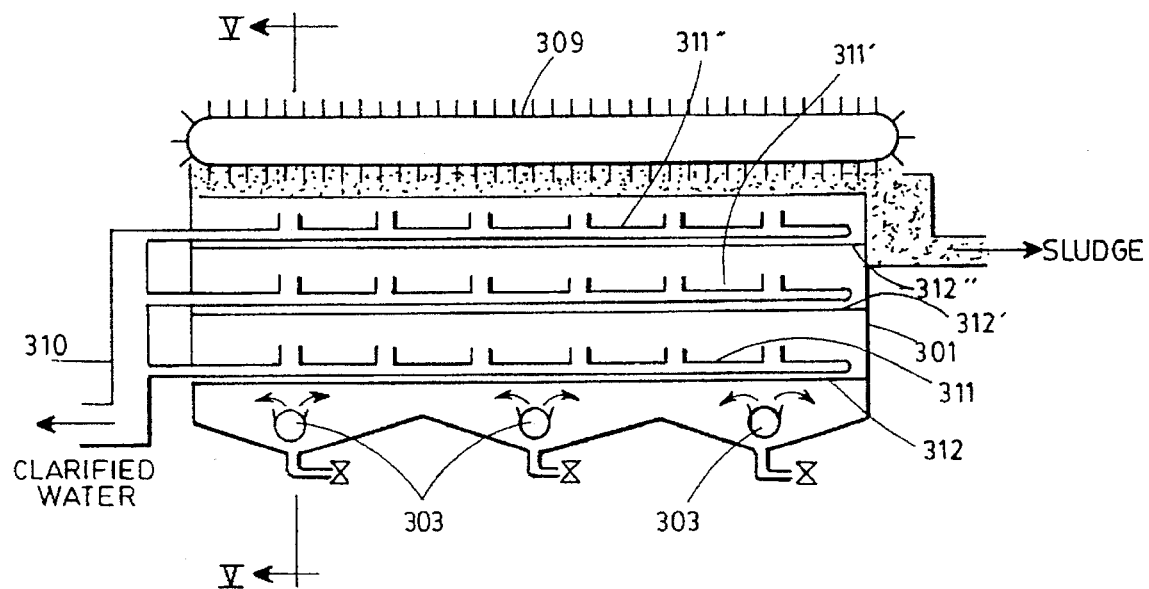
FIG. 4 is a schematic, longitudinal, cross-sectional representation of a clarifier according to a second preferred practical embodiment of the invention.
Figure 5:
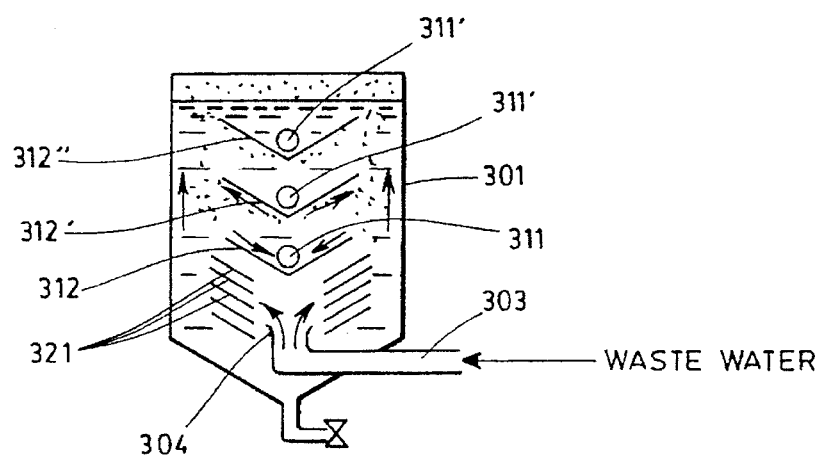
FIG. 5 is a transversal cross-sectional view of the clarifier shown in FIG. 4, taken along line V—V.

FIGS. 4 and 5 are schematic representation of a clarifier according to a second preferred practical embodiment of the invention.

This clarifier comprises an elongated tank 301 in which a plurality of elongated troughs 312, 312', 312", ... that extend along the full length of the tank and are stacked one above the other. The troughs are of the same shape and are centrally positioned within the tank, when seen in transversal view (see FIG. 5). They have a same apex.

A plurality of supply ducts 303 opens into the bottom portion 315 of the tank 301 just under the lowest trough 312. The outlet 304 of each duct 303 is shaped as a nozzle in order to control the formation and generation of microbubbles into the tank. Of course, a pump (not shown) is provided to inject a gas, preferably air, into some of the liquid before it enters the tank through the ducts 303.

Like in the previous embodiment, the walls of the troughs 312, 312', 312", . . . are equivalent to the plates or baffles mentioned above and define together a corresponding set of inclined channels that are symmetrical with respect to each other (see FIG. 5) and have common lower ends in which extend common liquid outlets 311, 311', 311", . . . in the form of straight pipes leading to a common outlet 310.

As is shown in FIG. 5, additional inclined baffles 321 can be provided close to the supply ducts 303 in order to separate the injected liquid into streams before it starts moving up on both sides of the tank 301 along the upper ends of the channels.

Scraping means 309 of a known structure are provided on top of the tank 301 to skim off the layer of sludge that is formed.

This second preferred embodiment works substantially in the same way as the fist one.

Experimental results carried out in a pulp and paper plant with a clarifier like the one shown in FIG. 3 have shown that the amount of waste water that can be treated, is substantially increased for a same surface area occupied by the clarifier onto the ground. More specifically, the rate of treatment per occupied surface area with the clarifier shown in FIG. 3 was equal to about 22 $m^3/m^2/h$, as compared to 13 to 14 $m^3/m^2/h$ with the compact clarifier shown in FIG. 1. The solid loading was equal to about 150 $kg/m^2/h$ as compared to 70 $kg/m^2/h$. The tests were made on the same waste water from a pulp and paper deinking plant, with the same chemical additive consumption.

Thus, the clarifier according to the invention increases the treatment capacity of waste water in terms of flow to be treated and amount of removed suspended particles, by at least 50% as compared to any existing clarifier occupying the same surface area onto the ground (footprint).

Furthermore, the invention gives the opportunity to increase the surface separation or the flow rate without any effect on the footprint of the equipment, keeping the same or a lower velocity for the waste water inside the clarifier as compared to the known clarifiers.

Of course, numerous modifications could be made to the clarifiers disclosed hereinabove without departing from the scope of the invention as defined in the appended claims.

I claim:

1. A clarifier for use in treating a liquid containing non-soluble particles in suspension in order to separate these particles from the liquid, said clarifier comprising:
    a tank of given height having a top portion and bottom portion;
    a supply duct opening into the bottom portion of the tank for feeding the liquid to be treated into said tank;
    injection means for injecting a gas under pressure into at least part of liquid supplied to the supply duct in order to saturate said liquid with said gas and thus to generate gas bubbles as the saturated liquid is subject to depressurization within the tank, the gas bubbles that are so-generated adhering to the particles in suspension in the liquid and lifting them up to form a floating layer of sludge in the top portion of the tank;
    scraping means in the top portion of the tank for skimming off the layer of sludge while it is formed;
    a plurality of plates extending at an angle within the tank above the supply duct, said plates defining a set of upwardly inclined channels each having an upper end that is opened and through which the liquid fed into the tank may enter the channel, each channel having a lower end and each channel not including a supply therein; and
    a liquid outlet mounted within the lower end of each channel to collect and remove from the tank the liquid that has been treated within the same.

2. A clarifier of claim 1, wherein the plates are mounted and connected to define a plurality of upwardly opening troughs that are stacked one above the other within the tank, each pair of superimposed troughs defining at least two of said channels, said at least two channels being symmetrical with respect to each other and having a common lower end and a common liquid outlet.

3. The clarifier of claim 2, wherein said tank is of a given horizontal cross-section and said troughs are in the form of similar funnels centrally positioned with the tank, said funnels being of the same given horizontal cross-section as the tank and each having a same apex.

4. The clarifier of claim 3, wherein the bottom portion of the tank is of the same cross-section and apex as the funnels positioned above it, and the supply duct opens at the apex of said bottom portion, whereby said bottom portion defines a nozzle.

5. The clarifier of claim 4, further comprising a collecting pipe projecting downwardly from the apex of each funnel below the corresponding liquid outlet to collect heavy particles that may fall within said funnel during treatment.

6. The clarifier of claim 5, wherein said given horizontal cross-section is square.

7. The clarifier of claim 5, wherein said given horizontal cross-section is round.

8. The clarifier of claim 5, wherein each liquid outlet opens into a reservoir adjacent to the tank and is provided with means to adjust outflow of the liquid from said liquid outlet into the reservoir thereby making it possible to adjust the flow rate within the corresponding channels.

9. The clarifier of claim 5, further comprising an air diffuser located under the scraping means in the top portion of the tank to inject air or an air-saturated liquid under the layer of sludge and thus increase the dry solid content of said layer of sludge.

10. The clarifier of claim 5, further comprising a screen integrated to the liquid outlet in order to filtrate the liquid that is collected from the tank.

11. A method for treating a liquid containing non-soluble particles in suspension in order to separate these particles from the liquid, said method comprising the steps of:
    providing a tank of a given height having a top portion, a bottom portion with a liquid supply duct and a plurality of internal plates extending at an angle with the tank, said plates defining a set of upwardly inclined channels each having an upper end that is opened and each channel not including a liquid supply duct therein, and a lower end that is closed;
    injecting a gas under pressure into some of the liquid to be treated in order to saturate said liquid with said gas;
    feeding said gas-saturated liquid in the duct at the bottom portion of the tank under the plates, the liquid that is so fed being subject to depressurization, thereby generating gas bubbles that adhere to the particles in suspension in the liquid and lift them up to form a floating layer of sludge in the top portion of the tank;

skimming off the layer of sludge while it is formed in the top portion of the tank; and collecting and removing the liquid treated within the tank at the lower end of each channel.

12. The method of claim 11, wherein the feeding step is carried out through a nozzle located under said internal plates so that the liquid to be treated be subjected to a controlled depressurization and may impinge the internal plate that is adjacent to the bottom portion of the tank.

13. The method of claim 12, comprising the additional steps of:

selecting an optimum overflow rate of treatment depending on the liquid to be treated; and selecting the number of said plates within the tank and thus the relative size of each channel to obtain the selected optimum overflow rate.

* * * * *